United States Patent [19]

Pritchett

[11] 3,720,723

[45] March 13, 1973

[54] PROCESS FOR PREPARING UNSATURATED CHLOROHYDROCARBONS AND SATURATED POLYCHLOROHYDROCARBONS BY OXYCHLORINATION OF HYDROCARBONS AND CATALYST SYSTEM THEREFOR

[75] Inventor: Ervin G. Pritchett, Cincinnati, Ohio

[73] Assignee: National Distillers and Chemical Corporation, New York, N.Y.

[22] Filed: Nov. 28, 1969

[21] Appl. No.: 876,187

Related U.S. Application Data

[63] Continuation of Ser. No. 529,899, Jan. 3, 1966, abandoned.

[52] U.S. Cl. .......260/658 R, 260/656 R, 260/659 A, 252/441
[51] Int. Cl..............................................C07c 17/10
[58] Field of Search............260/656 R, 658 R, 659 A

[56] References Cited

UNITED STATES PATENTS

| | | | |
|---|---|---|---|
| 3,267,162 | 8/1966 | Bohl | 260/659 A |
| 3,190,931 | 6/1965 | Laine et al. | 260/659 A |
| 2,957,924 | 10/1960 | Heiskell et al. | 260/659 A |
| 3,363,010 | 1/1968 | Schwarzenbek | 260/659 A |
| 2,914,575 | 11/1959 | Feathers et al. | 260/654 A |
| 2,838,577 | 6/1958 | Cook et al. | 260/656 R |

FOREIGN PATENTS OR APPLICATIONS 677,714  1/1964  Canada..........................260/659 A Primary Examiner—Howard T. Mars
Assistant Examiner—Joseph A. Boska
Attorney—Allen A. Meyer, Jr.

EXEMPLARY CLAIM

1. A process for the preferential oxychlorination of ethane and/or ethyl chloride as a reactant to form 1,2-dichloroethane as the major reaction product, which comprises feeding the reactant ethane and/or ethyl chloride in the vapor phase in admixture with hydrogen chloride in an amount within the range from about 0.05 to about 5 equivalents per mole of the reactant and with molecular oxygen in an amount within the range from about 0.2 to about 1.5 moles per equivalent of hydrogen chloride in contact with a catalyst consisting essentially of a copper chloride and a Group II b metal chloride in an amount within the range from about 20 to about 70 mole percent based on the moles of copper, at a temperature within the range from 250° to 400°C, and recovering 1,2-dichloroethane as the major reaction product.

11 Claims, No Drawings

PROCESS FOR PREPARING UNSATURATED CHLOROHYDROCARBONS AND SATURATED POLYCHLOROHYDROCARBONS BY OXYCHLORINATION OF HYDROCARBONS AND CATALYST SYSTEM THEREFOR

This application is a continuation of copending application Ser. No. 529,899, filed Jan. 3, 1966, now abandoned.

This invention relates to a process and catalyst system for the oxychlorination of hydrocarbons, so as to form unsaturated chlorohydrocarbons and saturated polychlorohydrocarbons, and more particularly to a process for the oxychlorination of ethane to produce preferentially vinyl chloride and 1,2-dichloroethane, using as the catalyst therefor copper chloride in combination with a Group IIb metal chloride.

The chlorination of lower aliphatic hydrocarbons and benzene as well as their partly chlorinated products, using a mixture of hydrogen chloride and oxygen or an oxygen-containing gas such as air are referred to as oxychlorination reactions. In these processes, the material to be chlorinated is reacted in the vapor phase with gaseous hydrogen chloride and oxygen over a suitable metal chloride catalyst at elevated temperatures up to about 700°C.

In contrast to chlorination processes, which are costly because they require chlorine gas, oxychlorination processes can be carried out using hydrogen chloride, which is available in many manufacturing complexes as a by-product of other processes. As a starting material, saturated hydrocarbons are certainly preferable to olefinic hydrocarbons, such as ethylene, because olefins normally are derived from the saturated hydrocarbons by cracking, which requires a separate step. However, in the oxychlorination processes which have been provided heretofore, olefins have been the preferred materials, because they react readily and in high yield, undergoing simple addition with the hydrogen chloride, whereas saturated hydrocarbons have given only poor yields, probably because they can react only via difficult substitution routes. Thus, for example, the addition of chlorine to ethylene directly yields 1,2-chloroethane, evenly and in high yield, whereas up until now, it has not been possible to prepare bis chloro hydrocarbons from ethane in any reasonable yield, using available oxychlorination catalysts and processes.

Thus, for example, U.S. Pat. No. 2,807,656 patented Sept. 24, 1957 to Cherniavsky, and British Pat. No. 635,013 published Mar. 29, 1950, describe processes for the production of saturated and unsaturated halogenated hydrocarbons from alkenes. The process of British Pat. No. 635,013 yields both vinyl halides and ethyl halides from the unsaturated hydrocarbons. As the catalysts, halides or oxyhalides of zinc. aluminum, bismuth, antimony, iron and vanadium are employed. A typical first stage reaction product in the Example is obtained from a reaction carried out at 440°C. without a catalyst, and contains 9.1 mol percent of vinyl chloride and 2.3 mol percent of ethylene dichloride, with 72 mol percent of ethylene. This is reacted with more HCl, after removal of vinyl chloride, over a catalyst of copper chloride and zinc chloride at 190°C., to give a product composed of 16.3 mol percent of ethyl chloride, 2.3 mol percent ethylene dichloride and 77.7 mol percent of unreacted ethylene. These are rather low yields of ethylene dichloride.

The process of U.S. Pat. No. 2,807,656 is carried out using zinc chloride as the chlorination catalyst, with a promoter such as copper, lithium, antimony, magnesium, calcium, bismuth and the like, under conditions such that the ethane is substantially inert, and the ethylene reacts with hydrogen chloride to form ethyl chloride, unreacted ethane, and a minimum of by-products. A typical reaction, according to Example I, resulted in a 90 percent conversion of ethylene, with a 99.5 percent yield of ethyl chloride, based on the amount of ethylene converted. None of the examples shows the formation of dichlorinated products in any significant amount.

U.S. Pat. No. 2,407,828, patented Sept. 17, 1946, to Gorin, describes the oxychlorination of saturated hydrocarbons such as methane and ethane, using a cupric chloride-containing salt melt. The cupric chloride is obtained by the reaction of cuprous chloride with halogen acid gas and an oxygen-containing gas. The resulting cupric halide melt is then transferred to a separate reaction zone, wherein it is contacted with a counterflow of hydrocarbon gases or vapors, thereby forming the corresponding alkyl or aryl halides, and reforming cuprous chloride therein. A minor proportion of potassium chloride can be included in the catalyst, together with other halides of Groups I, II, III and IV of the Periodic System having molecular weights greater than copper, such as lead, zinc, silver and thallium, which can be used in place of or together with the alkali metal halides.

The principal reaction product of this process is the primary halide, but small amounts of dihalides, unsaturated halides and olefins can be formed. In Example 4 a product is obtained composed of 60.3 mol percent of ethylchloride, 2.8 mol percent of ethylene, 24.6 mol percent of ethylene dichloride, 5.6 mol percent of ethylene monochloride, 3.3 mol percent of ethylene trichloride, and 3.4 mol percent of ethylene tetrachloride. However, only 30.2 mol percent of the ethylene gas had reacted in this procedure, using copper chloride- potassium chloride salt melt at 445°C.

French Pat. No. 1,326,738 Apr. 1, 1963, describes the preparation of ethylenically unsaturated chlorinated hydrocarbons from aliphatic hydrocarbons or chlorohydrocarbons, using hydrogen chloride and a catalyst composed of cupric chloride, zinc chloride and potassium chloride. The composition of a typical product shown in Table II was 70.4 percent of vinyl chloride, 12.5 percent of ethylene dichloride, 4.7 percent ethylene trichloride, 4.0 percent of ethyl chloride, and the remainder, a mixture of halogenated methanes. This reaction was carried out at 500°C., using a catalyst composed of copper chloride, potassium chloride and zinc chloride.

The high operating temperatures required in most prior oxychlorination processes has led to a number of difficulties. At high temperatures, the hydrogen chloride fed tends to increase corrosion and handling problems, both during the reaction and in separating unreacted hydrogen chloride from the product stream. Moreover, at high reaction temperatures, the metal halide oxychlorination catalysts show a considerable volatility, and tend to be entrained in the product stream, these losses increasing the cost of operation and separation. At high temperatures, the oxygen present in the stream can also react with the hydrocarbons and their partly chlorinated products, leading to considerable losses, due to burning to carbon oxides and water. Localized hot spots within the catalyst bed may also occur, giving difficulties in controlling the reactor temperature, and leading to serious decompositions and increased yields of by-products in these portions of the reaction mixture.

It would accordingly be preferable to carry out oxychlorination processes at rather low reaction temperatures, but unfortunately this has not been possible. The oxychlorination of saturated hydrocarbons in particular has required very high reaction temperatures. For example, the direct oxychlorination of ethane to vinyl chloride requires a temperature of about 500°C. At lower reaction temperatures, there is a change in product distribution to favor saturated chlorohydrocarbons, and at temperatures below about 450°C. ethyl chloride replaces vinyl chloride as a major product. Unfortunately, losses both by burning and difficulties with catalyst volatility increase rapidly above 400°C.

In order to reduce catalyst volatility at high reaction temperatures, it has been proposed that the catalyst be diluted by the addition of metal halides of lower volatility, or which will form double salts with the catalyst halides and so reduce volatility. For example, potassium chloride, as described in French Pat. No. 1,326,738 and in U.S. Pat. No. 2,407,828, has been incorporated for this purpose. However, it has been determined in accordance with the instant invention that in the oxychlorination of ethane, for example, potassium chloride deleteriously affects the reaction product distribution, and leads to the production of an increased proportion of ethyl chloride in the product stream at the expense of vinyl chloride and 1,2-dichloroethane, which is readily convertible to vinyl chloride. Even at very high hydrogen chloride feeds, such as about three equivalents or more per mole of reactant to be chlorinated, product distributions in ethane oxychlorination tend to favor ethyl chloride under these conditions, particularly at desirably high conversions of ethane to chlorinated products.

In accordance with the instant invention, lower saturated aliphatic hydrocarbons and chlorohydrocarbons are oxychlorinated preferentially to unsaturated chlorohydrocarbons and saturated polychlorohydrocarbons, employing as the oxychlorination catalyst a mixture of copper chloride and a chloride of a Group IIb metal, in the presence of hydrogen chloride and oxygen. This process is capable of producing high yields of the preferred chlorinated hydrocarbons, at reaction temperatures below about 450°C. and a feed ratio of chlorinating agent to reactant considerably less than about three equivalents of chlorinating agent per mole of reactant. Under these conditions, only minor amounts of saturated monochlorohydrocarbons are obtained.

The invention further provides an oxychlorination catalyst for use in any oxychlorination process consisting essentially of copper chloride in combination with a Group IIb metal chloride as cocatalyst. As the Group IIb metal, zinc is preferred, but there can also be employed chlorides of cadmium and mercury. Both cuprous and cupric chlorides can be used. Any cuprous chloride at the start of the reaction will be converted to cupric chloride under the oxidation conditions of the process, in the presence of oxygen and hydrogen chloride, and the cuprous chloride formed as a reaction product of the oxychlorination also is converted back to cupric chloride under the reaction conditions. Similarly, both mercurous and mercuric chloride can be employed, as well as zinc chloride and cadmium chloride.

The relative proportions of copper chloride and Group IIb metal chloride of the catalyst are not critical. Satisfactory proportions of Group IIb chloride range from about 20 to about 70 mol percent, preferably from about 30 to about 60 mol percent, based on the moles of copper chloride present.

The catalyst also can be prepared in situ from a mixture of any compound of copper and any compound of a Group IIb metal that is convertible under the oxychlorination conditions to the corresponding metal chlorides. Thus, for instance, oxides of the metal can be used, as well as nitrites, nitrates, sulfites, sulfates, phosphates, acetates, oxalates, formates, cyanides, borates, carbonates and hydroxides.

In addition to the copper chloride and Group IIb metal chloride, the catalyst composition can include a chloride of a metal other than an alkali metal which reduces volatility of the catalyst system under the oxychlorination conditions. Such halides include, among others, halides which are capable of forming double or triple salts with the other catalyst components, or which have a lower volatility than the other catalyst components, and consequently reduce the volatility for one or both of these reasons. Typical halides in this group which do not have a deleterious effect upon selectivity of the catalyst include magnesium chloride, barium chloride, strontium chloride, calcium chloride, lead chloride and cerium chloride.

A convenient method for preparing the catalyst from the corresponding chloride is to mix a copper chloride such as cupric chloride with a Group IIb metal chloride in common solution, preferably an aqueous solution, but organic solvent solutions can also be used, and subsequently evaporate the solvents used, thereby forming a coprecipitate of the two chlorides as a homogeneous mixture. Granules or particles thus obtained can be composed of the mixed salts, or of cocrystallized salts. Double decomposition reactions to form the salts can also be carried out in such solutions, for instance, reaction of the oxides or hydroxides in aqueous hydrochloric acid solution to form the chlorides upon removal of the water solvent.

In order to facilitate the process of the invention, by exposing as high a surface area of the catalyst as possible, it is preferred that the catalyst be deposited on a suitable support. However, a support is not essential, and can be omitted.

When a support is used, the total concentration of copper expressed as cupric chloride should be within the range from about 0.1 to about 25 weight percent, and preferably from about 1 to about 15 weight percent, based on the weight of the catalyst support. Satisfactory supports are the various forms of alumina, such as a-alumina, titania, zirconia, silica, pumice, carbon and other known catalyst carrier materials. The carrier materials should be inert under the oxychlorination reaction conditions. Those skilled in the art will perceive what supports can be employed from the preceding description. Especially preferred are catalyst supports having a high surface area, and preferably having a surface area greater than about 1 square meter per gram, in order to afford maximum contact of the reactants with the catalyst.

The average particle size of the catalyst, whether or not it is supported, is chosen according to the reactor design. For fixed bed operations, in large-size equipment, large-size particles, such as one-eighth inch tablets or spheres, are preferable. Catalysts for use in fluid bed operations are preferably finely-divided, such as for example from 100 to 200 mesh in size. When the catalyst is supported, the support that is employed has a particle size that is within the stated ranges, so that the support after impregnation with the catalyst need not be further subdivided, thus disturbing the surface layer of catalyst on the support.

The catalyst is applied to the support by conventional techniques. Usually, the support is immersed in a common solution of the catalyst compounds, and the solvent is then evaporated, depositing the catalyst on the surface of, and within the pores of, the support.

Potassium chloride and other alkali metal chlorides are definitely deleterious to the catalyst systems of the invention, and are not employed. They upset the catalyst selectivity and consequent distribution of the halogenated products obtained, so that unsaturated monochlorides such as vinyl chloride and saturated dichlorides, such as ethane dichlorides, are obtained in very low yields, if at all. It will consequently be understood that the term "consisting essentially of", as employed in the specification and claims, is intended to exclude the materials which deleteriously affect catalyst selectivity, and is specifically intended to exclude alkali metal halides, such as potassium chloride.

The process of the invention is carried out by passing over the catalyst, at a temperature at which the oxychlorination proceeds, the saturated aliphatic hydrocarbon or chlorohydrocarbon on the vapor phase together with the hydrogen chloride gas and oxygen, resulting in preferential formation of the unsaturated chlorohydrocarbon and saturated polychlorohydrocarbon.

The process will proceed under a great variety of reaction temperatures and pressures. Temperatures of within the range of about 200° to about 450°C. and preferably from about 250° to about 400°C., will give excellent yields of the desired products. It is preferred to operate the process at or near atmospheric pressure, but both superatmospheric and subatmospheric can be employed, if desired. Thus, the reaction pressure can lie within the range from about 0.5 mm. up to about 200 atmospheres, but preferably lies within the range from about 10 mm. to about 2 atmospheres.

The ratios of the reactants are stoichmetrically selected to give the desired reaction products, plus a small excess, if desired. Large excesses of the chlorinating agent, hydrogen chloride, can be employed if desired, and very small proportions also can be used, if a relatively small conversion of the saturated hydrocarbon can be accepted.

Thus, for example, the chlorinating agent, hydrogen chloride, can be employed in a proportion within the range from about 0.05 to about 5 equivalents for each mole of saturated hydrocarbon to be chlorinated. However, it is preferred to employ an amount from within the range of about 0.1 to about 1 equivalent per mole. At low feed ratios of the hydrogen chloride, the excess hydrocarbon feed serves as a diluent for the oxychlorination reaction, and does not upset the distribution of the desired reaction product.

The proportion of oxygen also can be widely varied. Amounts within the range from about 0.2 to about 1.5 moles of molecular oxygen per equivalent of chlorinating agent can be used. Oxygen itself or any oxygen-containing gas can be employed, but it is preferred that any components of the gas other than oxygen be inert to the reaction. Air is a completely satisfactory oxygen-containing gas. There can also be employed mixtures of oxygen and nitrogen, mixtures of oxygen and helium, mixtures of oxygen and carbon dioxide, mixtures of oxygen and argon, and mixtures of oxygen and chlorinated methanes such as carbon tetrachloride and chloroform.

Preferably, the amount of oxygen is within the range from about 0.5 to about 1 mole per equivalent of hydrogen chloride. An excess of oxygen over the stoichiometric 0.5 mole per equivalent of hydrogen chloride is generally beneficial to the conversion and yield in the oxychlorination reaction of the invention.

The feed rate of the reaction mixture should permit a superficial residence time in the catalyst bed within the range from about 0.1 to about 50 seconds. A residence time from about 0.5 to about 20 seconds is generally adequate, and is preferred, for optimum yield in a minimum time. However, the feed rate chosen will of course depend upon the reaction temperature, the reactant feed ratios, and the particular hydrocarbon or chlorinated hydrocarbon reactant in the oxychlorination. The optimum feed rates for any given set of reaction conditions can readily be determined empirically.

The process of the invention is applicable to any lower saturated aliphatic hydrocarbon or chlorinated saturated aliphatic hydrocarbon having from one to about 10 carbon atoms. The process is of particular application to ethane, but it is also applicable to ethyl chloride and like mono- or poly-chlorinated saturated aliphatic hydrocarbons. Typical hydrocarbons to which the process can be applied include, in addition to ethane and ethyl chloride, methane, propane, 1-chloropropane, 1,2-dichloropropane, butane, 1-chlorobutane, 1,4-dichlorobutane, 1-chloro-2-methylpropane, secondary butyl chloride, isopropyl chloride, pentane, 1-chloropentane, isoamyl chloride, tertiary amyl chloride, secondary amyl chloride, 1,3,5-trichloropentane, 1-chlorohexane, hexane, isohexyl chloride, heptane, heptyl chloride, 2-ethylheptyl chloride, 2-ethylhexane, 2-ethylhexylchloride, octane, isooctane, nonane, decane, and 1-chlorodecane.

The following Examples in the opinion of the inventors represent preferred embodiments of their invention.

EXAMPLE 1

A series of catalysts was prepared for comparison purposes, all based on cupric chloride, with additions of potassium chloride, zinc chloride and cadmium chloride. The catalysts were prepared by identical procedures, and supported on α-alumina.

The α-alumina used as the support for these catalysts was prepared from 10 to 20 mesh η-alumina (Aluminum Company of America, Grade F-1, meshed to size on standard screens.) This was heated for 16 hours at about 1200°C. in an electric oven. An analysis by X-ray showed the product to be α-alumina.

To the alumina, in a suitable round-bottom flask, was added rapidly a solution of the catalyst. In the case of Catalyst A, the solution was composed of 3 parts of cupric chloride in 250 parts of water, added to 97 parts of the 10 to 20 mesh α-alumina. In the case of Catalyst B, the solution was a mixture of 3 parts of cupric chloride and 1.75 parts of potassium chloride, deposited from aqueous solution on 95.3 parts of the α-alumina. In the case of Catalyst C, the solution was composed of a mixture of 3 parts cupric chloride and 3 parts zinc chloride, deposited from common aqueous solution on 94 parts of the α-alumina. In the case of Catalyst D, the solution was composed of 3 parts of cupric chloride and 4.1 parts of cadmium chloride, deposited on 92.9 parts of the α-alumina.

After the catalyst solution and α-alumina had been thoroughly mixed, the round bottom flask was attached to a Labline Rotovak, and water was removed at a vacuum of about 20 mm. of mercury, first at room temperature and finally at 90°C., to produce 100 parts of the supported catalyst.

As the reactor, there was used a 14 mm. internal diameter glass tube about 15 inches long, equipped with a 4 mm. outside diameter thermowell. The reactor was packed with a ½ inch glass wool plug, a 5 inch packing of the 10 to 20 mesh η-alumina (to act as a pre-heater for reactive gases), 10 grams of the supported catalyst, and another ½ inch glass wool plug. The packed reactor was placed in a vertical tube furnace, pre-heater packing up, care being taken to hold the packed bed within the heated area of the furnace. To the bottom of the reactor was attached a U-tube sample collector. During the process this was cooled to about minus 80°C. in a suitable bath. A water-spray scrubber followed the cold bath, to remove unused hydrogen chloride from the uncondensed exit gases.

In each test run, with the tube furnace-heated to 375°C., a mixture of ethane (0.13 mol per hour), hydrogen chloride (0.065 mol per hour) and oxygen (0.0325 mol per hour) was passed into the top of the reactor at about 1 atmosphere pressure. Exit gases condensed in the sample collector over a timed period (normally one hour), were diluted with at least 10 volumes of decalin, and analyzed via vapor phase chromatography. The mole ratios of the reaction products is shown in Table I which follows:

Table I

| Catalyst (CuCl$_2$) | A | B | C | D |
|---|---|---|---|---|
| Cocatalyst (Equimolar on CuCl$_2$) | none | KCl | ZnCl$_2$ | CdCl$_2$ |
| Millimoles per Hour of Product: | | | | |
| Ethyl Chloride | 18. | 31. | 1.2 | 6.2 |
| 1,2-Dichloroethane | 4.7 | 2.6 | 11.7 | 7.6 |
| Vinyl Chloride | 0.2 | 0.5 | 0.7 | 0.2 |
| Molar Ratio of desired products to Ethyl Chloride | 0.3 | 0.1 | 10.0 | 1.3 |

The test data shows the importance of the zinc chloride and cadmium chloride in directing the oxychlorination towards the formation of vinyl chloride and 1,2-dichloroethane, and suppressing formation of ethyl chloride. In the absence of the zinc of cadmium chloride (Catalyst A) 18 millimoles per hour of ethyl chloride are produced, and only 0.7 millimole per hour of 1,2-dichloroethane. Addition of potassium chloride increases the proportion of ethyl chloride to 31 millimoles per hour, and decreases the formation of 1,2-dichloroethane to 2.6 millimoles per hour (Catalyst B). In the presence of zinc chloride, however, 11.7 millimoles per hour of 1,2-dichloroethane are obtained, and only 1.2 millimoles per hour of ethyl chloride. Cadmium chloride is somewhat less active than zinc chloride, but the proportion of 1,2-dichloroethane is 7.6 millimoles per hour as compared to 6.2 millimoles per hour of ethyl chloride, a considerable improvement over Catalysts A and B. The ratios show that the improvement in the case of Catalyst C is 33 fold, and in the case of Catalyst D, fourfold.

Examples 2 to 6

A series of catalyst systems was prepared, containing differing proportions of zinc chloride to cupric chloride. These catalyst systems were tested, using the apparatus and procedure of Example 1, on ethane. The total cupric chloride remained at 3 percent of the total catalyst and support in each composition. The results obtained are shown in Table II.

Table II

| Example No. | Control | 2 | 3 | 4 | 5 | 6 |
|---|---|---|---|---|---|---|
| Mole % ZnCl$_2$ in Catalyst | 0 | 9 | 33 | 50 | 60 | 75 |
| Millimoles per Hour of Product | | | | | | |
| Ethyl chloride | 18. | 12. | 2.8 | 1.2 | 1.1 | 0.9 |
| 1,2-Dichloroethane | 4.7 | 10.8 | 12.6 | 11.7 | 10.2 | 2.1 |
| Vinyl Chloride | 0.2 | 0.4 | 0.6 | 0.7 | 1.2 | 0.2 |
| Ratio of desired products to Ethyl Chloride (Molar) | 0.3 | 0.9 | 4.7 | 10. | 10. | 2.6 |

(Molar)

It is evident from the data that optimum conversion of ethane to 1,2-dichloroethane is obtained at from about 50 to 60 mole percent of zinc chloride in the catalyst. A significant improvement in 1,2-dichloroethane formation is shown starting at 9 mole percent dichloride, and even at 75 mole percent of zinc chloride, 1,2-dichloroethane is formed preferentially to ethyl chloride, but at this molar ratio the overall conversion is reduced. The data taken as a whole shows that good yields of 1,2-dichloroethane are obtained with catalysts having from about 20 to about 70 mol percent of zinc chloride. Optimum conversion to vinyl chloride is shown at the same ratios.

Example 7

Catalysts based on combinations of cupric chloride and zinc chloride and cupric chloride and potassium chloride were prepared for purposes of comparison. The catalyst support used for these catalysts analyzed 81.2 percent $Al_2O_3$ (almost completely alpha, by X-ray analysis) and 17.2 percent $SiO_2$, had a surface area of 20 square meters per gram, and was in the form of one-eighth inch pellets. Onto 94 parts of the support was deposited a mixture of 3 parts cupric chloride and 3 parts zinc chloride from a common aqueous solution, and the latter was evaporated to furnish 100 parts of supported catalyst.

As a control, a similar catalyst was prepared by adding 95.3 parts of the same pellets to an aqueous solution of 3 parts cupric chloride and 1.7 parts of potassium chloride and 200 parts of water.

The water was evaporated, using the procedure of Example 1, to furnish 100 parts of catalyst in each case.

The reactor used was a glass tube 21 mm. internal diameter and 15 inches long, equipped with a 4 mm. outside diameter thermowell, packed with 28 grams of supported catalyst, using ½ inch glass wool plugs to hold the bed in place. The reactor was mounted in the same manner as Example 1, and the same oxychlorination procedure was followed as in Example 1, at the temperatures shown in Table III, which follows:

Table III

| Applied Reactor Tem.,°C.: | 300 | 325 | 350 | 375 |
|---|---|---|---|---|
| Maximum Internal Temp.,°C.: | | | | |
| Control (KCl Cocatalyst) | 303 | 345 | 380 | 400 |
| Example 7 ($ZnCl_2$ Cocatalyst) | 303 | 340 | 360 | 385 |
| Mole Ratio of $ClCH_2CH_2Cl$ + $CH_2$=CHCl to $C_2H_5Cl$: | | | | |
| Control (KCl Cocatalyst) | 0.06 | 0.13 | 0.13 | 0.17 |
| Example 7 ($ZnCl_2$ Cocatalyst) | 5.8 | 73. | 31. | 28. |

It is evident from the data that the cupric chloride-potassium chloride catalyst gave very low yields of 1,2-dichlorethane and vinyl chloride, as compared to ethyl chloride. Marked increases, to more than 500 fold, were observed when zinc chloride was substituted for the potassium chloride, showing the effect of the potassium chloride in suppressing the desired 1,2-dichloroethane and vinyl chloride production. The marked effectiveness of the copper chloride-zinc chloride catalyst, in contrast, is evident from the data.

Examples 8 to 12

A catalyst system composed of three parts each of cupric chloride and zinc chloride was deposited from aqueous solution (using the procedure of Example 1) on a series of supports (94 parts of each support), which had been crushed where necessary and screened to a 10 to 20 mesh size. The catalyst supports were:

Example 8 — $\eta$-Alumina (Aluminum Company of America, Grade F-1) surface area, 210 sq. meters per gram.
Example 9 — $\alpha$-Alumina, as in Example 1.
Example 10 — Silica gel
Example 11 — Titania (Harshaw Chemical Company, Grade Ti–0102–T ⅛ inch pellets) surface area 70 square meters per gram.
Example 12 — Zirconia (Harshaw Chemical Company Grade Zr 0304 T, ⅛ inch pellets) surface area 50 square meters per gram.

Each of these supported catalysts was used in the oxychlorination of ethane, using the equipment and procedure set out in Example 1, but at the temperatures shown in Table IV which follows. The following data were taken:

Table IV

| Example No. | Catalyst Support | Mole Ratio $ClCH_2CH_2Cl$+ $CH_2CHCl$ to $C_2H_5Cl$ at Temperature (°C.): | | | |
|---|---|---|---|---|---|
| | | 325 | 340 | 350 | 375 |
| 8 | $\eta$-$Al_2O_3$ | | | | 11. |
| 9 | $\alpha$-$Al_2O_3$ | 3.8 | | 13. | 31. |
| 10 | $SiO_2$ (Gel) | | | | 6.8 |
| 11 | $TiO_2$ | 10. | 20. | 23. | 20. |
| 12 | $ZrO_2$ | 25. | 50. | 60. | |

It is evident from the data that products consistently high in the desired 1,2-dichloroethane and vinyl chloride reaction products were obtained, regardless of the support used. Superior yields were obtained using catalysts supported on $\alpha$-alumina, titania and zirconia, but excellent results also were obtained on the silica gel and $\eta$-alumina catalysts.

Example 13

An unsupported cupric chloride-zinc chloride catalyst system was prepared by evaporation of a common solution of both salts (3 parts each in 100 parts of water) containing 2 parts of concentrated hydrochloric acid. This unsupported catalyst was dispersed in a plug of glass wool, and placed in the reactor used in Example 1. Ethane was then oxychlorinated over this catalyst, using the reaction conditions of Example 1. The molar ratio of vinyl chloride plus 1,2-dichloroethane to ethyl chloride produced in this process was 10. When the cupric chloride-zinc chloride mixture was replaced with cupric chloride and potassium chloride, 1.7 parts for each 3 parts of cupric chloride, the molar ratio of the reaction products was only 0.24, showing a depressing effect of the potassium chloride, in contrast to the enhancing effect of the zinc chloride, in the process.

Example 14

An $\alpha$-alumina, shown to be very pure by X-ray analysis, was obtained by heating $\eta$-alumina (⅛ inch pellets) at about 1200°C. for 16 hours. The product had a surface area of 9 square meters per gram. On to 94 parts of this $\alpha$-alumina was deposited a mixture of 3 parts of cupric chloride and 3 parts of zinc chloride, from a common solution in 250 parts of methanol and 2.5 parts of concentrated hydrochloric acid. 28 grams of this supported catalyst was then employed in the oxychlorination of ethane, following the procedure of Example 7, but varying the oxygen content of the reactant feed, in accordance with the data shown in Table V.

Table V

| Reactant | Amount Fed—(millimoles per hour) | | |
|---|---|---|---|
| $C_2H_6$ | 120 | 120 | 120 |
| HCl | 60 | 60 | 60 |
| $O_2$ | 30 | 36 | 42 |

| Product | Amount Recovered (millimoles per hour) | | |
|---|---|---|---|
| $C_2H_5Cl$ | 0.15 | 0.1 | 0.3 |
| $ClC_2H_4Cl$ | 11.2 | 12.4 | 18.4 |
| $CH_2=CHCl$ | 3.2 | 3.3 | 1.3 |

It is apparent from the above data that an excess of oxygen over the theoretical amount required for complete hydrogen chloride conversion proved beneficial in this process. Although the ratio of vinyl chloride plus 1,2-dichloroethane to ethyl chloride decreased somewhat, after an initial rise, the percent of hydrogen chloride appearing as chlorine in these three products increased steadily.

Examples 15 and 16

A series of catalyst combinations was prepared, based on cupric chloride-zinc chloride, with additions of magnesium chloride and potassium chloride in order to reduce volatility under the oxychlorination conditions. The catalyst combinations were prepared in accordance with the procedure of Example 1, using equimolar proportions of the various catalyst components. The catalyst was then used in the oxychlorination of ethane, employing the apparatus and process conditions of Example 1. The results are reported in Table VI.

Table VI

| Example No. | Catalyst Combination | Mole Ratio: $ClCH_2CH_{2Cl}$ + $CH_{2CHCl}$ to $C_2H_5Cl$ |
|---|---|---|
| 15 | $CuCl_2/ZnCl_2$ | 10 |
| 16 | $CuCl_2/ZnCl_2/MgCl_2$ | 10 |
| Control | $CuCl_2/ZnCl_2/KCl$ | 0.5 |

It is evident from the data that the addition of magnesium chloride which serves to repress volatility does not in any way modify the selectivity of the copper chloride-zinc chloride catalyst system. On the other hand, potassium chloride definitely upsets selectivity, resulting in a negligible proportion of 1,2-dichloroethane and vinyl chloride to ethyl chloride.

Example 17

This example illustrates the oxychlorination of ethyl chloride.

28 grams of the cupric chloride-zinc chloride catalyst system of Example 14 was used in the oxychlorination of ethyl chloride. The reactor used was that described in Example 7, modified to allow a feed of ethyl chloride mixed with nitrogen in the feed ratio ethyl chloride/hydrogen chloride/oxygen/nitrogen of 25.8/25.8/12.9/25.8 ml. per minute. Yields of vinyl chloride plus 1,2-dichloroethane of 62 to 86 percent were obtained, at temperatures within the range of 275° to 325°C., at 75 to 95 percent conversions of the ethyl chloride.

For comparison purposes, ethyl chloride also was oxychlorinated using a cupric chloride-potassium chloride catalyst prepared by depositing onto 95.3 parts of the α-alumina of Example 14 a solution containing three parts cupric chloride and 1.7 parts potassium chloride, according to the procedure of Example 7. The reactor of Example 7 was also used, at the same feed ratios described above, with 28 grams of the cupric chloride-potassium chloride catalyst. At temperatures of from 350° to 375°C., only a 30 to 40 percent yield of vinyl chloride plus 1,2-dichloroethane was obtained, at 40 to 50 percent ethyl chloride conversions. At lower temperatures, conversions fell off very rapidly.

It is evident from these data that the zinc chloride gave a considerable gain in yield and conversion, and an appreciable reduction of reaction temperature.

Example 18

This example illustrates a two-stage oxychlorination, the first stage of ethane, and the second stage of the ethyl chloride rich product stream from the first stage. A separate catalyst system was used for each of the two reaction stages, in the first stage one based on cupric chloride-potassium chloride for the conversion of ethane to ethyl chloride as a major product, and in the second stage one based on cupric chloride-zinc chloride for the conversion of ethyl chloride (with residual ethane) from the first stage to 1,2-dichloroethane and vinyl chloride as major products. The catalyst systems used were those described in Example 17, and the reactor was that of Example 7. In the present experiment, the reactor was packed with 11 grams of the cupric chloride-potassium chloride catalyst system (first stage) followed by 17 grams of the cupric chloride-zinc chloride catalyst system (second stage) and placed in a single tube heater at 325°C. Reactants were entered at a 4/2/1 ratio of ethane/hydrogen chloride/oxygen and a total flow rate of 209 millimoles per hour.

To define the amounts of ethyl chloride, 1,2-dichloroethane and vinyl chloride produced in the first stage and subsequently fed in the reactant stream to the second stage, the products of the first stage only (cupric chloride-potassium chloride catalyst system) were analyzed separately, and the analyses obtained are given in Table VII. The products of the combined two stages also were analyzed, and the analyses obtained also are given in Table VII. It is apparent from the data of Table VII that ethyl chloride produced in the first stage reaction thereafter is converted to 1,2-dichloroethane-vinyl chloride products in the second stage reaction in excellent yield as a continuous process without intermediate purification of the first stage product stream.

Example 19

Example 18 was repeated except that the ethane-hydrogen chloride-oxygen reactant stream was fed to the reactor at a total rate of 312 millimoles per hour thus reducing residence time in both reaction stages. Analyses of the products of the two stages again are contrasted in Table VII. It is apparent from the data of Table VII that, in addition to ethyl chloride produced in the first stage, ethane unconverted in the first stage was converted to 1,2-dichloroethane-vinyl chloride products in the second stage.

Table VII

Two Stage Oxychlorination of Ethane

| | Example 18 | | Example 19 | |
|---|---|---|---|---|
| | 1st stage only | 2 stage process | 1st stage only | 2 stage process |

| Catalyst-Cocatalyst First Stage | CuCl₂/KCl | CuCl₂/KCl | CuCl₂/KCl | CuCl₂/KCl |
|---|---|---|---|---|
| Second Stage | none | CuCl₂/ZnCl₂ | none | CuCl₂/ZnCl₂ |
| Reactant Gases (M Mole/Hr.) | 209 | 209 | 312 | 312 |
| Product or Ratio | | | | |
| Ethyl Chloride (M Mole/Hr.) | 12.4 | 0.6 | 7.1 | 0.7 |
| 1,2-Dichloroethane (M Mole/Hr.) | 0.7 | 12.0 | 0.2 | 13.2 |
| Vinyl Chloride (M Mole/Hr.) | 0 | 0.6 | 0 | 0.8 |
| Mole Ratio of ClCH₂CH₂Cl + CH₂CHCl to C₂H₅Cl | 0.56 | 21. | 0.028 | 20. |

It is apparent from the data of Table VII that ethane can be oxychlorinated in two stages as well as in single stage processes such as were illustrated in Example 7. Furthermore, it is apparent from comparison of Examples 18 and 19 that the invention is applicable equally both to ethane and to ethyl chloride and as well to their mixtures one with the other and with other oxychlorination products of ethane.

Having regard to the foregoing disclosure, the following is claimed as the inventive and patentable embodiments thereof:

1. A process for the preferential oxychlorination of ethane and/or ethyl chloride as a reactant to form 1,2-dichloroethane as the major reaction product, which comprises feeding the reactant ethane and/or ethyl chloride in the vapor phase in admixture with hydrogen chloride in an amount within the range from about 0.05 to about 5 equivalents per mole of the reactant and with molecular oxygen in an amount within the range from about 0.2 to about 1.5 moles per equivalent of hydrogen chloride in contact with a catalyst consisting essentially of a copper chloride and a Group IIb metal chloride in an amount within the range from about 20 to about 70 mole percent based on the moles of copper, at a temperature within the range from 250° to 400°C, and recovering 1,2-dichloroethane as the major reaction product.

2. A process in accordance with claim 1 in which the reactant is ethane and the major reaction product is 1,2-dichloroethane.

3. A process in accordance with claim 1 in which the mixture of gaseous reactant comprises an amount of hydrogen chloride within the range from about 0.1 to about 1 equivalent per mole of the reactant.

4. A process in accordance with claim 1 in which the catalyst comprises copper chloride in combination with an amount of a Group IIb metal chloride within the range from about 30 to about 60 mol percent.

5. A process in accordance with claim 1 wherein the Group IIb metal chloride is zinc chloride.

6. A process in accordance with claim 1 wherein the Group IIb metal chloride is cadmium chloride.

7. A process in accordance with claim 1 in which the catalyst is supported on an inert carrier.

8. A process in accordance with claim 1 in which the reactant is ethyl chloride.

9. A process in accordance with claim 1 in which the oxygen is supplied as air.

10. A process in accordance with claim 1 in which the proportion of oxygen in the reaction mixture is within the range from about 0.2 to about 1.5 moles per equivalent of hydrogen chloride.

11. A process in accordance with claim 1 in which the contact time with the catalyst is within the range from about 0.1 to about 50 seconds.

* * * * *